US012573971B2

(12) United States Patent
Kotikelapudi et al.

(10) Patent No.: US 12,573,971 B2
(45) Date of Patent: Mar. 10, 2026

(54) OPEN-LOAD DETECTION FOR STEPPER MOTOR DRIVERS

(71) Applicant: Texas Instruments Incorporated, Dallas, TX (US)

(72) Inventors: Venkata Naresh Kotikelapudi, Bangalore (IN); Laxman Sreekumar, Thrissur (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 44 days.

(21) Appl. No.: 18/343,821

(22) Filed: Jun. 29, 2023

(65) Prior Publication Data

US 2024/0223111 A1 Jul. 4, 2024

(30) Foreign Application Priority Data

Jan. 3, 2023 (IN) .............................. 202341000308

(51) Int. Cl.
*H02P 8/36* (2006.01)

(52) U.S. Cl.
CPC ..................................... *H02P 8/36* (2013.01)

(58) Field of Classification Search
CPC ........ H02P 7/0094; H02P 6/007; H02P 27/08; H02P 8/36
See application file for complete search history.

(56) References Cited

U.S. PATENT DOCUMENTS

| | | | |
|---|---|---|---|
| 11,368,112 B2 | 6/2022 | Krishnamurthy et al. | |
| 11,646,684 B2 * | 5/2023 | Shankar .................... | H02P 8/12 |
| | | | 318/696 |
| 2021/0050808 A1 * | 2/2021 | Shankar .................... | H02P 8/12 |
| 2021/0099116 A1 | 4/2021 | Krishnamurthy et al. | |

FOREIGN PATENT DOCUMENTS

CN        113809962 A  * 12/2021  ................ H02P 8/36

OTHER PUBLICATIONS

Greenough et al., "A new high-efficiency stepper motor driver for old technology stepper motors," 2013 IEEE 25th Symposium on Fusion Engineering (SOFE), (IEEE, 2013), pp. 1-4.
(Continued)

*Primary Examiner* — Said Bouziane
(74) *Attorney, Agent, or Firm* — Xianghui Huang; Frank D. Cimino

(57) ABSTRACT

Motor driver circuitry including driver transistors coupled to first and second output terminals, gate driver circuitry with outputs coupled to gate terminals of the driver transistors, controller circuitry coupled to the gate driver circuitry, a trip limit current source, an open-load limit current source, comparator circuitry, and fault detect circuitry. The comparator circuitry is coupled to the driver transistors, to the trip limit current source, and to the open-load limit current source. The comparator circuitry compares a drive current at the driver transistors with a trip limit current responsive to a signal from the controller indicating a standstill state, and configured to compare the driver current with an open-load limit current responsive to the signal indicating a motor running state. The fault detect circuitry has an input coupled to the comparator output and has a fault output.

20 Claims, 7 Drawing Sheets

(56) References Cited

OTHER PUBLICATIONS

Marano et al., "Novel fully integrated 65 W stepper motor driver IC," International Symposium on Power Electronics, Electrical Drives, Automation and Motion (IEEE, 2006), pp. 680-684.

Hopkins, "Stepper motor driving," Application note AN235 (STMicroelectronics, 2012).

"DRV8962 Four-channel Half-Bridge Driver with Current Sense Outputs," Datasheet SLVSFV6 (Texas Instruments Incorporated, 2022).

"LMD18200 3A, 55V H-Bridge," Datasheet SNVS091F (Texas Instruments Incorporated, 2013).

* cited by examiner

OPEN-LOAD DETECTION FOR STEPPER MOTOR DRIVERS

BACKGROUND

This relates to electronic motor drive and control, and more particularly to circuitry and methods for controllably driving stepper motors.

Stepper motors are DC electric motors that controllably rotate and hold the rotational position of a rotor. A common type of stepper motor includes one or more coils driven by motor driver circuitry to control the rotational position and velocity of the rotor. For example, the rotor can be rotated to a particular rotational position by driving a current waveform with a variable amplitude (e.g., according to a sinusoidal waveform) to the motor coils, and can be held at a constant position by driving coil current at a constant amplitude. Stepper motor may be unipolar (a single pair of poles) or bipolar (two pairs of poles). In bipolar stepper motors, each pair of poles may be driven from metal-oxide-semiconductor field-effect transistors (MOSFETs) with gates driven by pulse-width modulation (PWM) signals from a driver circuit to provide the appropriate current waveform to the coils.

A useful attribute of stepper motors is the simplicity with which excitation changes at the motor control input translate to precise positional changes of the motor, without requiring an external sensor to monitor the position of the motor. Regulation of the currents in the stepper motor coils can attain precise position and velocity control to the extent sufficient for many precision applications.

To maintain this simplicity of operation, stepper motors are generally controlled by open-loop position control systems. Because of this open-loop control, however, the system controller in the motor driver circuitry may have no information regarding the torque demand of the motor or the load torque being applied to the motor. If the terminals of a motor coil are disconnected from the driver circuitry, the magnetic field from the coil will disappear and the motor will stall. The motor driver circuitry cannot sense this open-load condition, however, and thus will continue to drive its driver transistors, which can cause loss of motor position at the system controller, power loss due to conduction through the still-connected coil, and in some cases mechanical damage (e.g., vibration) to the motor itself.

One prior art approach passively detects an open-load condition at the coil terminals prior to power-up by pushing a fixed current into the coil terminals to detect whether a coil is connected, and begins driving the motor only if a coil is connected at those terminals. This approach is unable to detect disconnection of a motor coil during operation, however. In another prior art approach, external sensors are provided at the motor terminals to sense the presence of load. However, such external sensors can be cost-prohibitive both in the cost of the sensor and in the additional board space required, and have proven difficult to integrate with other fault-diagnostics in the motor drive system.

It is within this context that the embodiments described herein arise.

SUMMARY

In an example, motor driver circuitry includes driver transistors coupled to first and second output terminals, gate driver circuitry with outputs coupled to gate terminals of the driver transistors, controller circuitry coupled to the gate driver circuitry, a trip limit current source, an open-load limit current source, comparator circuitry, and fault detect circuitry. The comparator circuitry has a comparator output, inputs coupled to the driver transistors, an input coupled to the trip limit current source, and an input coupled to the open-load limit current source. The comparator circuitry receives a standstill signal from the controller circuitry and is configured to compare a drive current at the driver transistors with a trip limit current responsive to the standstill signal indicating a standstill state, and configured to compare the driver current with an open-load limit current responsive to the standstill signal indicating a motor running state. The fault detect circuitry has an input coupled to the comparator output and has a fault output.

In another example, a method of detecting an open-load condition at a motor driver circuit includes operating a motor driver circuit to provide drive current to a motor coil, sensing the drive current, comparing the drive current to one or more of a trip limit current and an open-load limit current, generating an open-load fault signal responsive to a standstill signal indicating a standstill state and the comparing step determining that the drive current is less than the trip limit current, and generating an open-load fault signal responsive to the standstill signal indicating a motor running state and the comparing step determining that the drive current is less than the open-load limit current.

In another example, stepper motor driver circuitry includes driver circuitry coupled to first and second output terminals, standstill detect circuitry configured to generate a standstill signal indicating an operating state, comparator circuitry coupled to the standstill detect circuitry and configured to compare a drive current at the driver transistors to a trip limit current responsive to the standstill signal indicating a standstill state, and to compare the drive current to an open-load limit current responsive to the standstill signal indicating a motor running state, and fault detect circuitry configured to present an open-load fault signal responsive to a signal at an output of the comparator circuitry.

Technical advantages enabled by one or more of these examples include detection of an open-load condition at outputs of a motor driver system during its operation, without requiring external sensors or closed-loop control. Further advantages include the ability to integrate active open-load detection into the motor driver circuitry, for example in the same integrated circuit and operable during different phases of a two-phase or bipolar stepper motor application. Further advantages include the avoiding of false open-load faults, such as at 0° phases in the sinusoidal current waveforms, and in both standstill and motor running operating states.

Other technical advantages enabled by these examples will be apparent to those of ordinary skill in the art having reference to the following specification together with its drawings.

BRIEF DESCRIPTION OF THE DRAWINGS

The same reference numbers or other reference designators are used in the drawings to illustrate the same or similar (in function and/or structure) features.

DETAILED DESCRIPTION

One or more examples are described herein as implemented in driver circuitry for electric stepper motors, as these examples can provide particular benefits in that context. However, aspects of these examples may be beneficially applied in other motor drive and control applications, as well as other implementations of driver circuitry using open-loop control. Accordingly, the following description is provided by way of example only.

Figure 1:
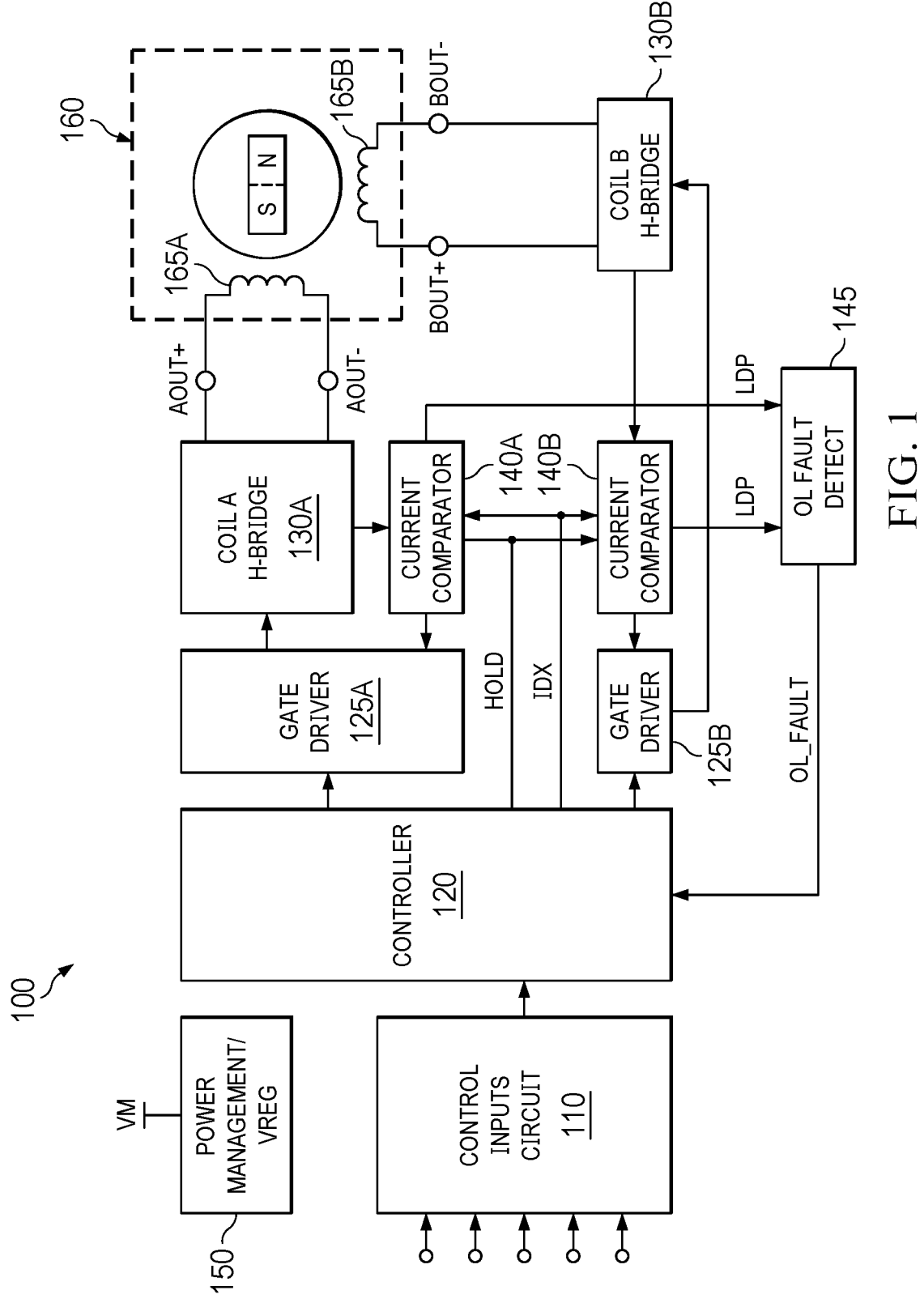
FIG. 1 is an electrical diagram, in block form, of a motor driver system according to the described examples.

FIG. 1 illustrates an example of a stepper motor driver system in which examples may be implemented. In this example, system 100 drives motor coils 165A and 165B in bipolar stepper motor 160. System 100 in this example includes control inputs circuit 110, controller 120, gate drivers 125A and 125B, H-bridges 130A and 130B, current comparator circuitry 140A and 140B, open-load fault detect circuitry 145, and power management and voltage regulator circuitry 150. System 100 may be implemented in a single integrated circuit, or alternatively may be implemented as more than one integrated circuit.

Control inputs circuit 110 in system 100 has inputs receiving control signals from an external source, for example a host computer, host microcontroller, or network node (e.g., in an "Internet of Things", or "IoT", environment). Examples of such control signals include enable signals, signals to advance a rotation of motor 160, signals indicating the direction of rotation, and signals indicating a granularity or resolution of an angular step of rotation. Control inputs circuit 110 may also receive mode configuration information, such as may be stored in a configuration register (e.g., in controller 120) to specify an operational mode. Control inputs circuit 110 may include analog and digital circuits including buffers, filters, level shifters, latches, and the like.

Control inputs circuit 110 has outputs coupled to inputs of controller 120. Controller 120 in system 100 includes logic circuitry, for example programmable, semi-custom, or custom (hard-wired) digital logic, programmed or configured to control the operation of system 100 in its driving and control of bipolar motor 160. Controller 120 accordingly has outputs coupled to inputs of gate drivers 125A and 125B. Controller 120 is configured to generate the appropriate control signals to gate drivers 125A and 125B to step the rotation of motor 160, for example to rotate the motor 160 at a selected velocity to a selected position, according to control inputs received by control inputs circuit 110.

Gate drivers 125A and 125B are coupled to H-bridges 130A and 130B, respectively. Gate driver 125A has outputs coupled to H-bridge 130A, to provide drive signals to the gates of field-effect transistors (FETs) in H-bridge 130A. In turn, H-bridge 130A has output terminals AOUT+ and AOUT− coupled to motor coil 165A. Similarly, gate driver 125B has outputs coupled to gates of FETs in H-bridge 130B, which in turn has output terminals BOUT+ and BOUT− coupled to motor coil 165B. For smooth operation of a bipolar stepper motor such as motor 160 of FIG. 1, the current conducted through coils 165A, 165B should have a phase separation of 90° to create a rotating magnetic field. Accordingly, coils 165A and 165B are positioned orthogonally in motor 160.

In system 100 of FIG. 1, current comparator circuitry 140A is coupled to H-bridge 130A and current comparator circuitry 140B is coupled to 130B, for regulation of the currents in coils 165A and 165B according to either a square wave or sine wave. Each of current comparator circuitry 140A, 140B includes current sensing transistors or elements to sense the coil currents driven by corresponding H-bridges 130A, 130B, and comparators to compare the sensed currents with reference currents. In many implementations, current regulation according to a sinusoid waveform can provide smooth operation and high resolution of the motor position. This sinusoid profile can be attained by "microstepping" the source coil currents according to the phase of the sine wave, for example by dividing a period of the sinusoid into a number of steps (e.g., 256 steps per quadrant). In this example, the reference current level used by comparators in current comparator circuitry 140A, 140B depends on the particular step within the sine wave. As will be described below, current comparator circuitry 140A and 140B receive index signals IDX indicating for each of coils 165A and 165B the current step or phase within the cycle, from which the corresponding current comparator circuitry 140A and 140B uses as the appropriate reference current level.

Examples of stepper motor control systems for regulating coil current according to a stepped or microstepped sinusoid waveform are described in U.S. Pat. No. 11,368,112, U.S. Patent Application Publication No. US 2021/0050808, and U.S. Patent Application Publication No. US 2021/0099116, all of which are commonly assigned herewith and incorporated herein by this reference.

System 100 of FIG. 1 also includes open-load fault detect circuitry 145. As shown in FIG. 1, open-load fault detect circuitry 145 has one or more inputs coupled to each of current comparator circuitry 140A and 140B, and has an output coupled to controller 120 to communicate an open-load fault signal OL_FAULT when this condition is detected. In this example and for purposes of open-load fault detection, current comparator circuitry 140A and 140B receive, from controller 120, a standstill signal HOLD indicating whether motor 160 is in a standstill state, holding its current position, or is in a motor running state in which its rotor is being rotated by the application of coil current.

Figure 2A:
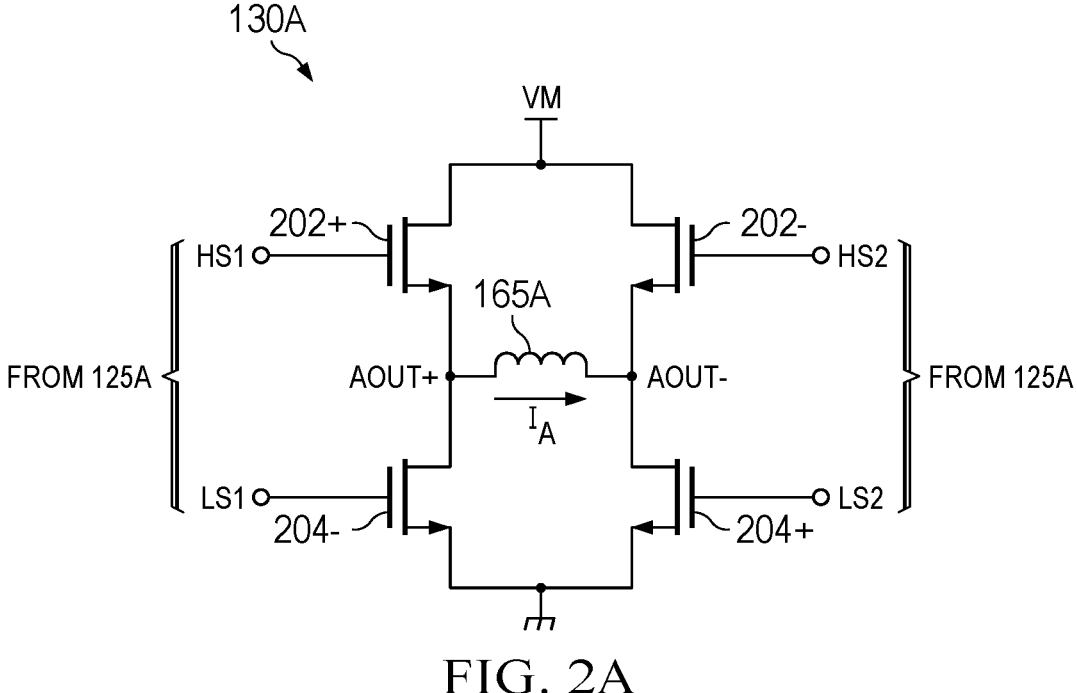
FIG. 2A is an electrical diagram, in schematic form, of an H-bridge driver according to an example.

FIG. 2A illustrates H-bridge 130A in system 100 of FIG. 1. H-bridge 130B may be constructed similarly. H-bridge 130A includes FETs 202+, 202−, 204+, and 204−. Each of FETS 202+, 202−, 204+, and 204− may be constructed as metal-oxide semiconductor (MOS) FETs of suitable construction for the voltage and current requirements of system 100. For high voltage or high power applications, FETs 202+, 202−, 204+, and 204− may be constructed according to a manufacturing technology suitable for high voltages and currents (e.g., as drain-extended MOSFETS).

In this example, FETs 202+, 202−, 204+, and 204− of gate driver 130A are n-channel devices. FET 202+ has its drain coupled to power supply voltage VM, its source at output terminal AOUT+ and its gate coupled to gate driver 125A to receive gate driver signal HS1. FET 202− has its drain coupled to power supply voltage VM, its source at output terminal AOUT− and its gate coupled to gate driver 125A to receive gate driver signal HS2. FET 204+ has its drain coupled to output terminal AOUT−, its source at a common potential (e.g., system or circuit ground), and its gate coupled to gate driver 125A to receive gate driver signal LS2. FET 204− has its drain coupled to output terminal AOUT+, its source at the common potential, and its gate coupled to gate driver 125A to receive gate driver signal LS1.

Coil 165A of motor 160 is coupled between output terminals AOUT+ and AOUT−. In this description, a positive coil current $I_A$ will be considered as flowing in the direction from output terminal AOUT+ to output terminal AOUT−. Accordingly, H-bridge 130A sources a positive current $I_A$ through coil 165A by gate driver 125A turning on FETs 202+ and 204+ and turning off FETs 202− and 204−, and sources a negative current $I_A$ by gate driver 125A turning on FETs 202− and 204− and turning off FETs 202+ and 204+.

Figure 2B:
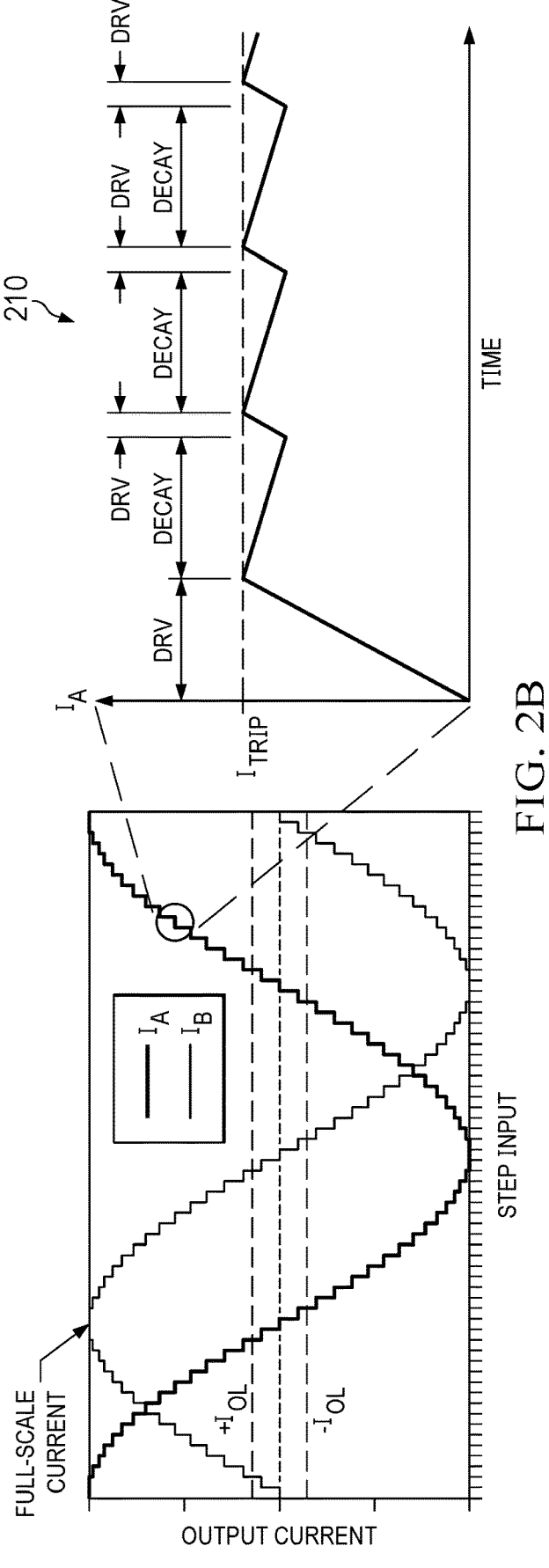
FIG. 2B and FIG. 2C are timing diagrams illustrating operation of the system of FIG. 1.

FIG. 2B illustrates the operation of gate drivers 125A and 125B, under the control of controller 120 in system 100, in driving motor 160 with quadrature-phase microstepped sinusoidal current waveforms. As shown in the left-hand side of FIG. 2B, coil currents $I_A$ and $I_B$ are 90° out of phase relative to one another, with current $I_A$ leading current $I_B$ in this example. Each cycle of coil currents $I_A$ and $I_B$ is subdivided in time into microstepped intervals, in this example sixteen microsteps per quadrant (64 microsteps per period). Within each microstep, system 100 operates to regulate the coil current sourced by H-bridges 130A, 130B relative to a trip limit current $I_{TRIP}$ corresponding to the sinusoidal amplitude (e.g., a mean value) over that interval. In this example, current comparator circuitry 130 and gate drivers 125A, 125B regulate coil currents $I_A$, $I_B$ within each of these discrete microsteps. In this example, the trip limit current $I_{TRIP}$ is produced by a digital-to-analog converter (DAC) within current comparator circuitry 130 in response to an index signal IDX indicating the current microstep interval.

Waveform 210 in the right-hand side of FIG. 2B illustrates the regulation of coil current $I_A$ within a given microstep. Within that microstep, gate driver 125A turns on FETS 202+ and 204+ during a drive mode (DRV), causing coil current $I_A$ to increase toward trip limit current $I_{TRIP}$. When coil current $I_A$ reaches trip limit current $I_{TRIP}$ for this microstep, a decay mode (DECAY) begins, in which one or both of FETs 202+, 204+ are turned off and one or both of FETs 202−, 204− are turned on, depending on the decay rate desired (e.g., either a "fast decay" or a "slow decay"). For example, gate driver 125A may drive gate signals HS1, HS2, LS1, LS2 in drive, fast decay, and slow decay phases according to Table 1:

TABLE 1

| Gate signal | Drive | Fast decay | Slow decay |
|---|---|---|---|
| HS1 | ON | OFF | OFF |
| LS1 | OFF | ON | ON |
| HS2 | OFF | ON | OFF |
| LS2 | ON | OFF | ON |

Within each microstep, H-bridges 130A and 130B are controlled between alternating drive and decay modes to maintain the peak coil current at the desired level for that phase (e.g., at that value of index IDX).

Figure 3A:
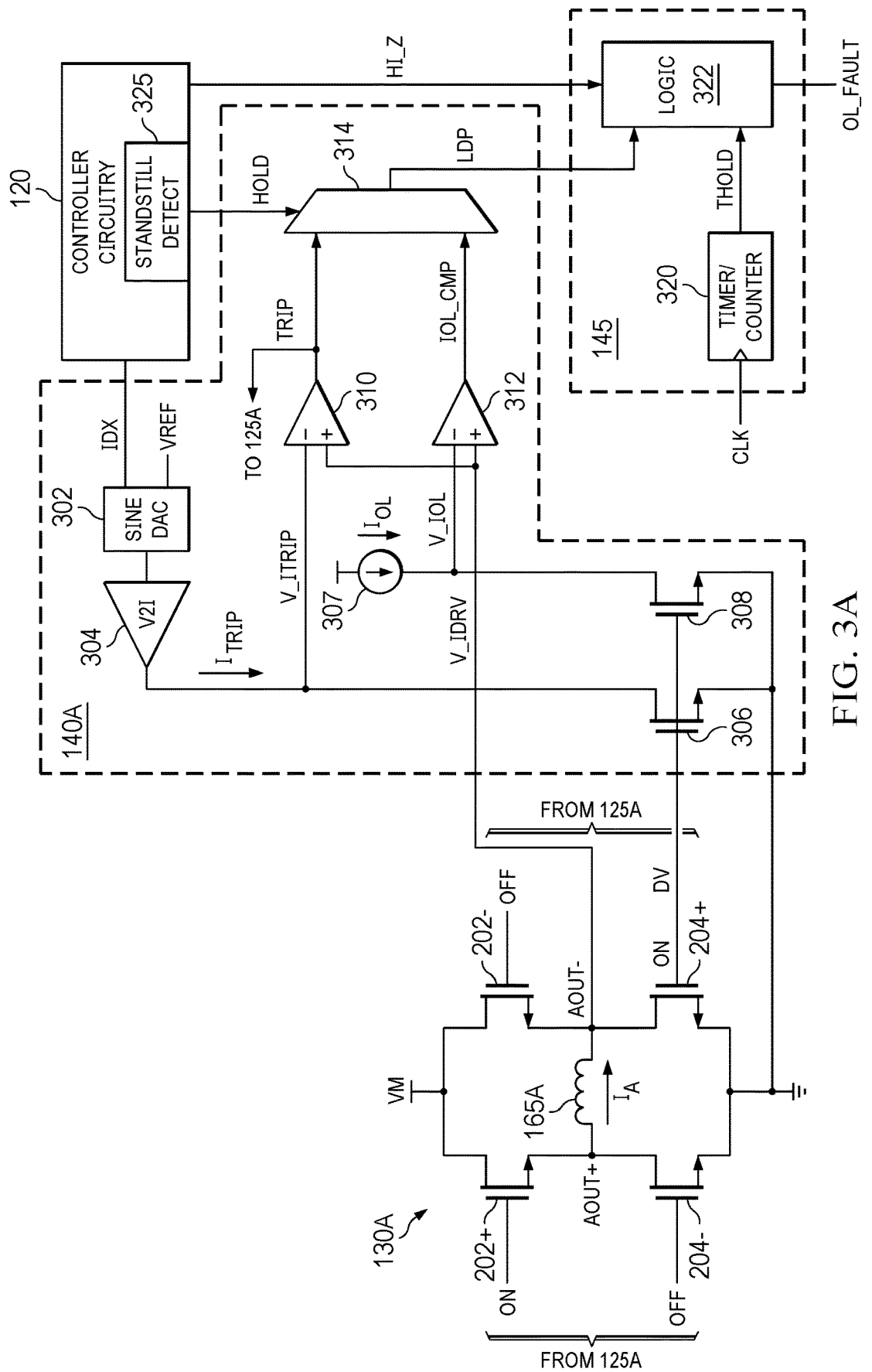
FIG. 3A is an electrical diagram, in block and schematic form, of current comparator circuitry and fault detect circuitry in the system of FIG. 1 according to an example.

FIG. 3A illustrates an example of current comparator circuitry 140A and open-load fault detect circuitry 145 as implemented in system 100 for H-bridge 130A. Current comparator circuitry 140B associated with H-bridge 130B is similarly constructed in this example. As shown in FIG. 3A, current comparator circuitry 140A includes sine DAC 302, voltage-to-current (V2I) buffer 304, transistor 306, current source 307, transistor 308, comparators 310 and 312, and multiplexer 314. Open-load fault detect circuitry 145 includes timer/counter 320 and logic circuitry 322. In addition, system 100 includes standstill detection circuitry 325, which may be logic circuitry implemented either within controller 120 (as shown in FIG. 3A) or outside of controller 120 within system 100. By way of example, FIG. 3A illustrates the portion of current comparator circuitry 140A for sensing a positive-valued coil current $I_A$ being sourced by H-bridge 130A during the drive phase (e.g., with FETs 202+ and 204+ turned on and FETs 202− and 204− turned off).

Within current comparator circuitry 140A, sine DAC 302 has an input coupled to controller 120 to receive index signal IDX, which indicates the step or microstep in the sinusoidal waveform currently driven by H-bridge 130A to motor coil 165A in this example. Sine DAC 302 also receives a reference voltage VREF representative of the full-scale current level, for example as may be generated by power management and voltage regulator circuitry 150. Sine DAC 302 has an output coupled to an input of V2I stage 304, and forwards a voltage corresponding to the amplitude of a reference current for the current microstep. V2I stage 304 converts the voltage from sine DAC 302 into a corresponding trip limit current $I_{TRIP}$. The output of V2I stage 304 is coupled to the drain of n-channel MOS transistor 306. MOS transistor 306 has its source at ground, and its gate coupled to the gate of FET 204+ in H-bridge 130A to receive drive voltage DV as applied by gate driver 125A during the drive phase of positive coil current $I_A$. The drain of transistor 306 is coupled to the negative input of comparator 310.

Current source 307 is biased from power supply voltage VM, and is biased to conduct current at a selected open-load limit current $I_{OL}$. Open-load limit current $I_{OL}$ is a relatively low amplitude current limit within the full-scale range of the sinusoidal waveform of coil currents $I_A$, $I_B$. FIG. 2B illustrates an example of positive and negative open-load limit currents $+I_{OL}$ and $−I_{OL}$, for the positive and negative half-cycles, respectively, of the microstepped sinusoidal coil current waveforms. Current source 307 sources open-load limit current $I_{OL}$ into the drain of n-channel MOS transistor 308. MOS transistor 308 has its source at ground, and its gate coupled to the gates of transistor 306 and low-side FET 304+ in H-bridge 130A to receive drive voltage DV applied during the drive phase of positive coil current $I_A$. The drain of transistor 308 is coupled to the negative input of comparator 312.

In this example, the positive inputs of comparators 310 and 312 are coupled to output terminal AOUT− of H-bridge 130A to receive a voltage V_IDRV corresponding to the level of coil current $I_A$ conducted through low-side FET 204+. Comparator 310 compares the sensed coil current $I_A$, as reflected by voltage V_IDRV, with trip limit current $I_{TRIP}$ for the current microstep, as reflected by voltage V_ITRIP at the drain of transistors 306. Similarly, comparator 312 compares the sensed coil current $I_A$ with open-load limit current $I_{OL}$, as reflected by voltage V_IOL at the drain of transistor 308.

Figure 3B:
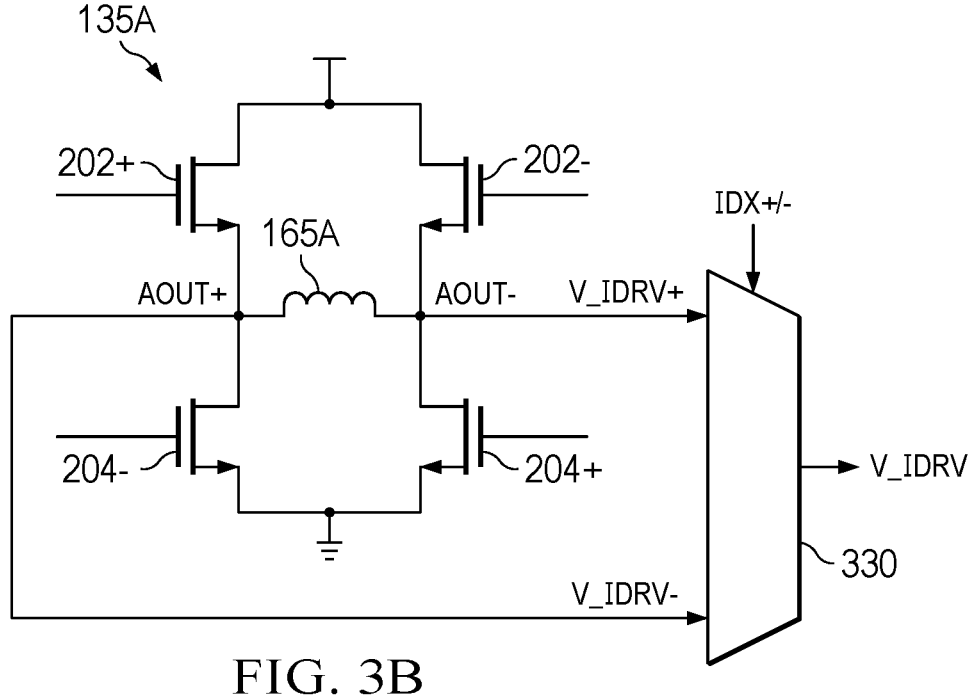
FIG. 3B is an electrical diagram, in block form, of another example of current comparator circuitry in the system of FIG. 1.

FIG. 3A illustrates the portion of current comparator circuitry 140A as configured for sensing coil current $I_A$ in positive half-cycles of its sinusoid. Current comparator circuitry 140A may be configured to similarly sense negative polarity coil current $I_A$. For example, as shown in FIG. 3B, multiplexer 330 in current comparator circuitry 140A has inputs coupled to both of output terminals AOUT+ and AOUT– to receive voltages V_IDRV– and V_IDRV+, respectively. Multiplexer 330 has a control input coupled to receive signal IDX+/– (e.g., from controller 120) indicating whether the current microstep is in the positive or negative half-cycle of the sinusoidal waveform. An output of multiplexer 330 presents voltage V_IDRV to comparators 310 and 312. In positive half-cycles, for example indicated by signal IDX+/– at a high logic level, multiplexer 330 selects voltage V_IDRV+ for forwarding as voltage V_IDRV. In negative half cycles, as indicated by signal IDX+/– at a low logic level, multiplexer 330 selects voltage V_IDRV– at terminal AOUT+ for forwarding as voltage V_IDRV.

Referring again to FIG. 3A, an output of comparator 310 is coupled to one input of multiplexer 314. Comparator 310 presents a trip signal TRIP at its output to indicate the result of its comparison of the sensed coil current $I_A$ with trip limit current $I_{TRIP}$. In this example, comparator 310 compares voltage V_IDRV with voltage V_$I_{TRIP}$, where those voltages serve as proxies for coil current $I_A$ and trip limit current $I_{TRIP}$, respectively. In some implementations, the output of comparator 310 may be fed back to gate driver 125A to regulate the driving of H-bridge 130A within the current microstep interval, as described above relative to FIG. 2B. Similarly, comparator 312 has an output coupled to another input of multiplexer 314. At this output, comparator 312 presents a signal IOL_CMP indicating the result of its comparison of the sensed coil current $I_A$ with open-load limit current $I_{OL}$, by way of comparing voltage V_IDRV with voltage V_IOL at the drain of transistor 308.

Multiplexer 314 has a select input coupled to standstill detection circuitry 325, to receive standstill signal HOLD indicating the operating state of motor 160 as either in a standstill state or a motor running state. Multiplexer 314 has an output at which it presents a signal LDP corresponding to the result of the one of comparators 310, 312 that is selected in response to standstill signal HOLD. In this example, multiplexer 314 selects trip signal TRIP at the output of comparator 310 in response to standstill signal HOLD indicating (e.g., at a logic "1" level) that the operating state of motor 160 is in a standstill state, and selects signal IOL_CMP in response to standstill signal HOLD indicating (e.g., at a logic "0" level) that motor 160 is in a motor running state. In this example, the output of multiplexer 314, presenting signal LDP, is coupled to open-load detection circuitry 145.

Figure 3C:
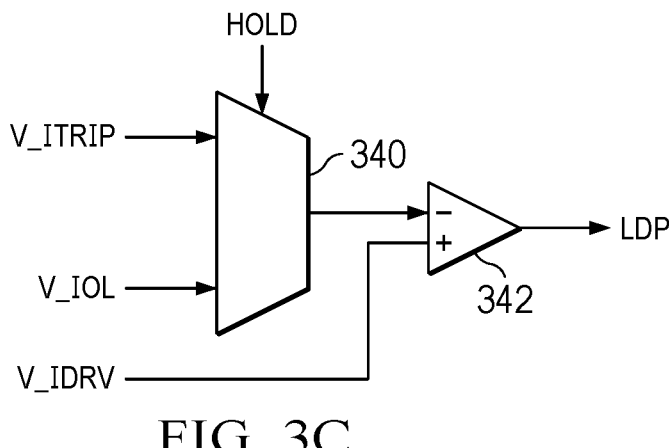
FIG. 3C is an electrical diagram, in block and schematic form, of coil current select circuitry in the system of FIG. 1 according to an example.

FIG. 3C illustrates an alternative arrangement within current comparator circuitry 140A. In this example, multiplexer 340 and comparator 342 shown in FIG. 3A are implemented in place of comparators 310 and 312, and multiplexer 314. Multiplexer 340 has inputs receiving voltages V_ITRIP and V_IOL, and a select input receiving standstill signal HOLD from standstill detection circuitry 325. Multiplexer 340 selects one of voltages V_ITRIP and V_IOL in response to standstill signal HOLD. The output of multiplexer 340 is coupled to a negative input of comparator 342. A positive input of comparator 342 is coupled to terminal AOUT+ to receive the voltage V_IDRV. Comparator 342 has an output presenting signal LDP, indicating the result of the comparison between voltage V_IDRV and the one of voltages V_ITRIP and V_IOL selected by multiplexer 340. According to this alternative, the output of comparator 342 presents signal LDP to open-load detection circuitry 145.

Referring back to FIG. 3A, signal LDP from current comparator circuitry 140A (e.g., either from multiplexer 314 of FIG. 3A or from comparator 342 in the alternative of FIG. 3C) is received at an input of logic circuitry 322 in open-load detection circuitry 345. Open-load detection circuitry 345 may also receive a signal LDP from current comparator circuitry 140B, for example at an additional instance of logic circuitry 322. In this arrangement, a single instance of open-load fault detect circuitry 145 may receive corresponding signals LDP from both of current comparator circuitry 140A and current comparator circuitry 140B, from which a single open-load fault signal OL_FAULT is generated. Alternatively, a separate instance of open-load fault detect circuitry 145 may be provided for each of current comparator circuitry 140A and current comparator circuitry 140B, to generate separate open-load fault signals for each of H-bridges 130A, 130B.

Timer/counter 320 has an input receiving a clock signal CLK, for example a clock signal used in the PWM of gate drivers 125A, 125B or another clock signal of a period shorter than the microstep interval. Timer/counter 320 has an output coupled to logic circuitry 322 of open-load detection circuitry 145, at which timer/counter 320 outputs signal THOLD to indicate the elapse of a selected hold time interval. For example, timer/counter 320 may measure the hold time interval by counting a selected number of cycles of clock signal CLK, with that number of cycles programmable or selectable by way of a digital value applied to timer/counter 320 by controller 120. In this example, the hold time interval can be tuned by selection or programming of timer/counter 320 according to the characteristics of motor 160 or the particular motor application, or dynamically tuned based on the instantaneous rotational speed of motor 160.

Logic circuitry 322 of open-load detection circuitry 145 has an input coupled to controller 120 to receive a signal HI-Z, which indicates that a high-impedance state (corresponding to a phase angle of 0° in the sinusoidal coil current waveform) is present at H-bridge 130A. Logic circuitry 322 has an output presenting open-load fault signal OL_FAULT, for example to controller 120 or to other circuitry in system 100.

According to this example, the current operating state of stepper motor driver system 100 determines the current limit used in detecting an open-load condition at output terminals AOUT+ and AOUT– and terminals BOUT+ and BOUT–. More particularly, standstill signal HOLD from standstill detection circuitry 325 is used to determine whether open-load detection circuitry 145 detects an open-load fault based on trip limit current $I_{TRIP}$ when motor 160 is in a standstill state, or based on open-load limit current $I_{OL}$ when motor 160 is in a motor running state.

For the case of motor 160 is in a standstill or holding state, the use of trip limit current $I_{TRIP}$ for determination of an open-load fault avoids the generation of a false open-load fault in certain conditions. As shown in FIG. 2B, the amplitude of coil currents $I_A$ and $I_B$ for some microsteps of the sinusoidal waveform, namely for phases near 0°, is below open-load limit current $I_{OL}$. If the position of motor 160 is being held at a standstill at a position corresponding to one of coil currents $I_A$, $I_B$ at one of these phases, that coil current $I_A$ or $I_B$ would be regulated at a trip limit below the open-load limit $I_{OL}$. The coil current $I_A$ or $I_B$ would thus never reach the open-load limit $I_{OL}$ even though its coil 165A or 165B is connected and being driven. The use of open-load limit $I_{OL}$ as the criterion for open-load fault detection would thus give a false fault at standstill at certain phases. By instead comparing coil currents $I_A$, $I_B$ against the trip limit current $I_{TRIP}$ for the particular microstep in the standstill condition, the generation of a false open-load fault can thus be avoided. So long as the coil current is being actively regulated, the coil current is necessarily reaching that trip limit current $I_{TRIP}$, meaning that the corresponding coil is still connected. According to this example, the open-load fault signal OL_FAULT will not be issued in this event.

On the other hand, the determination of open-load faults based on open-load limit current $I_{OL}$ according to this example also avoids generation of a false open-load fault when motor 160 is in a motor running state. In some implementations, stepper motor driver system 100 may be coupled to one or both of motor coils 165A, 165B having a sufficiently high inductance that coil currents $I_A$, $I_B$ may not reach the regulated level trip limit current $I_{TRIP}$ in at least some of the microsteps of the sinusoidal waveform. Use of trip limit current $I_{TRIP}$ as the criterion for detecting an open-load condition thus could result in false detection of an open-load fault. According to this example, detection of open-load faults with motor 160 in the motor running state is instead based on comparing coil currents $I_A$, $I_B$ against the open-load limit $I_{OL}$, avoiding this potential cause of a false open-load fault.

As also described above, open-load fault detect circuitry 145 in this example issues an open-load fault signal OL_FAULT in response to signal LDP from current comparator circuitry 140A. 140B continuing for a measured hold time interval as measured by timer/counter 320. This hold time interval avoids the generation of a false open-load fault in the motor running state during those phases in which trip limit current $I_{TRIP}$ is less than the open-load limit $I_{OL}$. Because the amplitudes of coil currents $I_A$. $I_B$ sinusoidally vary in the motor running state, the duration of the microsteps in which trip limit current $I_{TRIP}$ is less than the open-load limit $I_{OL}$ does not continue for long. Proper setting of the hold time interval measured by timer/counter 320 to be longer than the duration at these low-current phases near 0° can thus avoid false open-load faults in the motor running state.

Figure 2C:
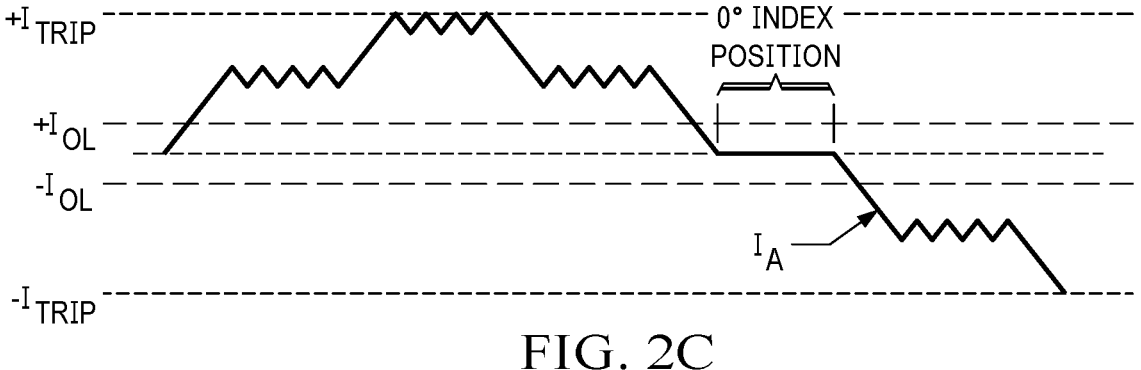

FIG. 2C illustrates a portion of a cycle in the microstepped sinusoidal waveform for coil current $I_A$ at which the current is changing polarity (e.g., from positive polarity to negative polarity). An interval can exist during this change of polarity at which H-bridge 130A is not driving current in either direction at terminals AOUT+ and AOUT−. This interval is indicated in FIG. 2C as the 0° index position, corresponding to a phase angle of 0° in the sinusoidal waveform of coil current $I_A$. For the case of H-bridge 130A at this 0° index position, terminals AOUT+ and AOUT− are effectively in a high-impedance state because transistors 202+, 202−, 204+, 204− are turned off by gate driver 125A. In the example of FIG. 3A, signal HI-Z from controller 120 indicates (e.g., at a logic "1" level) to logic circuitry 322 that H-bridge 130A is in this high-impedance state. To avoid false detection of an open-load fault at this zero coil current condition, for example of motor 160 is being held at 0° for one of its coils, logic circuitry 322 disables the generation of open-load fault signal OL_FAULT in response to signal HI-Z indicating a high-impedance condition at terminals AOUT+, AOUT−.

Figure 4:
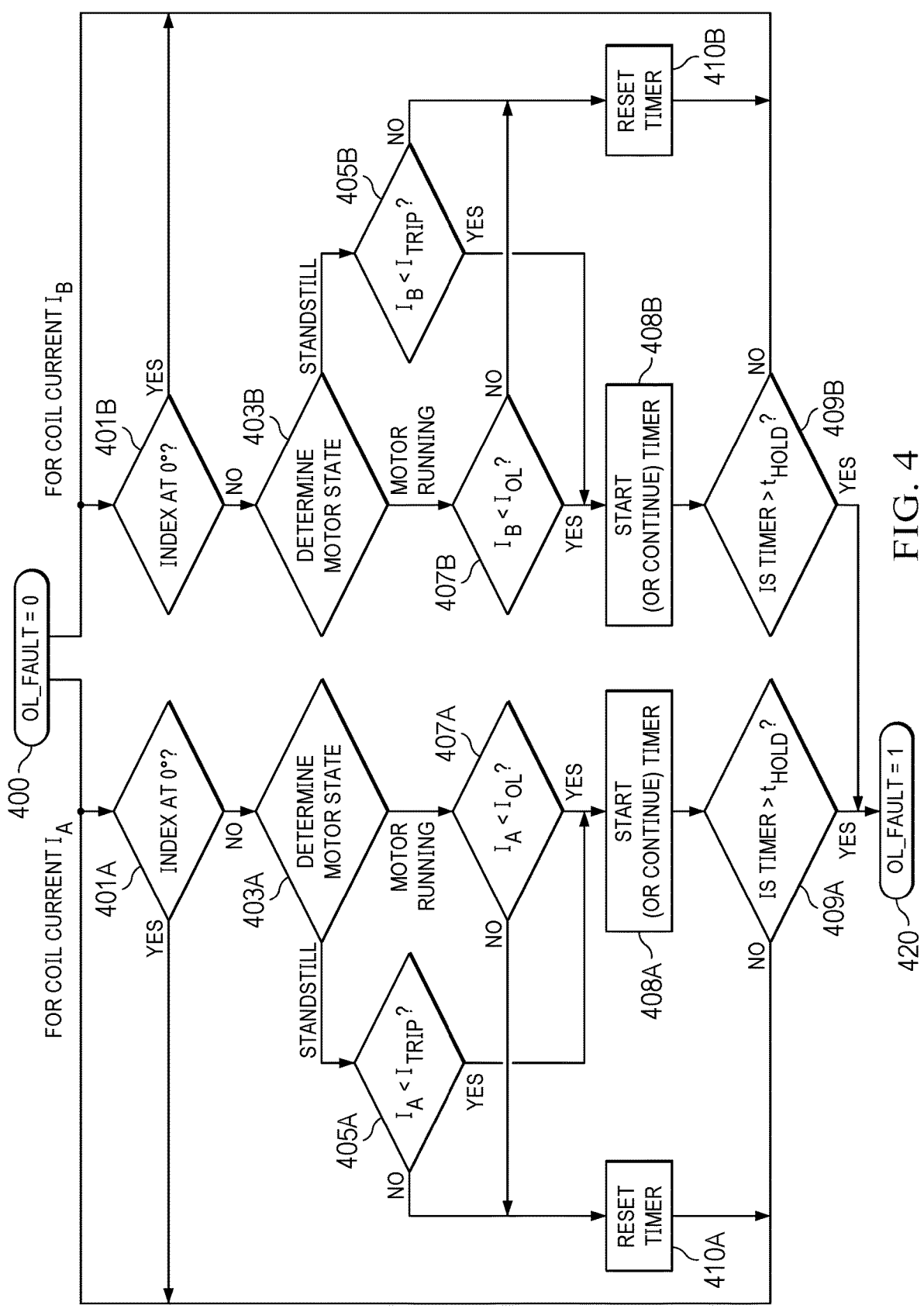
FIG. 4 is a flow diagram illustrating a method of detecting an open-load condition at a motor driver system for a bipolar motor according to the described examples.

FIG. 4 is a flow chart illustrating a method of detecting an open-load condition at terminals of stepper motor driver system 100 described above. Controller 120 of system 100 may control execution of the method of FIG. 4, for example according to program instructions stored in memory of controller 120 or elsewhere in system 100. Alternatively, separate control logic or other circuitry, such as a state machine, implemented in system 100 may execute open-load fault detection according to this method.

Open-load fault detection according to this example begins from state 400 in which system 100 is driving motor 160. More particularly, in this state 400, system 100 is driving coil current $I_A$ from terminals AOUT+, AOUT− to coil 165A, and also driving coil current $I_B$ from terminals BOUT+, and BOUT− to coil 165B. Open-load fault signal OL_FAULT from open-load fault detect circuitry 145 is at a logic "0" level in this state 400, indicating no open-load fault.

According to this example method, each of coil currents $I_A$ and $I_B$ are separately and independently monitored by system 100 for open-load conditions, with open-load fault detect circuitry 145 issuing signal OL_FAULT (e.g., at a logic "1" level) in response to detection of an open-load fault at either of terminal pairs AOUT+ and AOUT−, and BOUT+ and BOUT−. For purposes of this description, the method of FIG. 4 will be described relative to the monitoring of coil current $I_A$. Monitoring of coil current $I_B$ to detect open-load faults at terminals BOUT+ and BOUT− can be performed in the same manner.

From state 400, decision 401A first determines whether the microstep index for coil current $I_A$ is at 0° phase. As described above relative to FIG. 2C and FIG. 3A, H-bridge 130 is in a high-impedance state at this 0° index position, with transistors 202+, 202−, 204+, and 204− turned off and thus zero coil current $I_A$ driven at terminals AOUT+ and AOUT−. Decision 401A in the example of FIG. 3A is performed by disabling logic circuitry 322 in open-load fault detect circuitry 145 in response to signal HI-Z indicating (e.g., at a logic "1" level) that H-bridge 130 is in a high-impedance state, floating terminals AOUT+ and AOUT−. If so (decision 401A is "yes"), the method remains at state 400, and open-load fault detection pauses until system 100 exits the high-impedance condition. In response to signal HI-Z indicating (e.g., at a logic "0" level) that H-bridge 130A is not in a high-impedance state (decision 401A is "no"), open-load fault detection advances to decision 403A.

In decision 403A, the current state of motor 160 as being driven by system 100 is determined, for example by standstill detection circuitry 325 based on inputs from controller 120. The result of decision 403A is communicated by standstill detection circuitry 325 issuing standstill signal HOLD to current comparator circuitry 140 at a logic level according to this determination. For example, standstill detection circuitry 325 may issue standstill signal HOLD (e.g., at a logic "1" level) to indicate that motor 160 is being held in a standstill state, or at a low logic level (e.g., at a logic "0" level) to indicate that motor 160 is in a motor running state.

In response to decision 403A determining that system 100 is holding motor 160 in a standstill state, current comparator circuitry 140 compares coil current $I_A$ to trip limit current $I_{TRIP}$ for the current microstep in the sinusoidal waveform of current $I_A$ in decision 405A. Conversely, in response to decision 403A determining that motor 160 is in a motor running state, current comparator circuitry 140 compares coil current $I_A$ to open-load limit current $I_{OL}$ in decision 407A. As described above relative to FIG. 3A, decisions 403A, 405A, and 407A may be performed by comparators 310 and 312 comparing coil current $I_A$ with trip limit current $I_{TRIP}$ and open-load limit current $I_{OL}$, respectively, and multiplexer 314 selecting the output of comparator 310 or 312 in response to the state of standstill signal HOLD. Alternatively, as described above relative to FIG. 3C, multiplexer 340 may select between trip limit current $I_{TRIP}$ and open-load limit current $I_{OL}$ for coupling to an input of comparator 342 in response to the state of standstill signal HOLD, with comparator 342 comparing coil current $I_A$ with the selected current limit.

If comparison decision 405A or 407A, as the case may be, determines that coil current $I_A$ is at or above (in magnitude) trip limit current $I_{TRIP}$ or open-load limit current $I_{OL}$, respectively (decision 405A or 407A is "no"), open-load fault detection returns to state 400 to repeat the comparison and detection process. On the other hand, if the selected comparison decision 405A or 407A determines that coil current $I_A$ is below (in magnitude) trip limit current $I_{TRIP}$ or open-load limit current $I_{OL}$, respectively (decision 405A or 407A is "yes"), process 408A is executed. In process 408A, timer/counter 320 begins measuring the duration of the current open-load fault condition, for example by initiating the counting of cycles of clock signal CLK. Decision 409A then determines whether the open-load fault condition has continued for the duration of a selected hold time $t_{HOLD}$ as measured by timer/counter 320. If hold time $t_{HOLD}$ has not yet elapsed since timer/counter 320 was started in process 408A (decision 409A is "no"), monitoring of coil current $I_A$ relative to trip limit current $I_{TRIP}$ or open-load limit current $I_{OL}$ continues, for example by repeating the process from state 400. Timer/counter 320 continues monitoring the fault condition so long as coil current $I_A$ remains below trip limit current $I_{TRIP}$ or open-load limit current $I_{OL}$ and hold time $t_{HOLD}$ has not yet elapsed (decision 409A returns "no").

If the fault condition resolves prior to the elapse of hold time $t_{HOLD}$, by coil current $I_A$ exceeding (in magnitude) trip limit current $I_{TRIP}$ or open-load limit current $I_{OL}$ (decision 405A or 407A is "no"), timer/counter 320 is reset in process 410A, and the comparison and detection process continues from state 400. If, however, the fault condition of coil current $I_A$ below (in magnitude) trip limit current $I_{TRIP}$ or open-load limit current $I_{OL}$ has continued for the duration of hold time $t_{HOLD}$ (decision 409A is "yes"), open-load fault detect circuitry 145 issues open-load fault signal OL_FAULT (e.g., at a high logic level, or logic 1) to controller 120 in process 420. Controller 120 can then process the fault by the appropriate action, for example by disabling gate drivers 125A, 125B for both motor coils, and the like. In addition, controller 120 may report fault diagnostic information to a host controller or system, for example by reporting which of coils 165A, 165B is open, the number of microsteps missed during this open-load condition, etc.

The examples described in this specification enable motor driver circuitry to detect an open-load condition at its outputs during operation, without external sensors or closed-loop control. More particularly, active open-load detection according to these examples can be integrated into the motor driver circuitry, for example in the same integrated circuit and operable during different phases of a two-phase or bipolar stepper motor application. Further, these examples can avoid generating false open-load faults, such as at 0° phases in the sinusoidal current waveforms, and in both standstill and motor running operating states.

As used herein, the terms "terminal," "node," "interconnection," and "pin" are used interchangeably. Unless specifically stated to the contrary, these terms are generally used to mean an interconnection between or a terminus of a device element, a circuit element, an integrated circuit, a device, or other electronics or semiconductor component.

Unless otherwise stated, "about," "approximately," or "substantially" preceding a value means+/−10 percent of the stated value. Modifications are possible in the described examples, and other examples are possible within the scope of the claims.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party. While, in some example embodiments, certain elements are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description.

While one or more embodiments have been described in this specification, it is of course contemplated that modifications of, and alternatives to, these embodiments, such modifications and alternatives capable of obtaining one or more of the technical effects of these embodiments, will be apparent to those of ordinary skill in the art having reference to this specification and its drawings. It is contemplated that such modifications and alternatives are within the scope of the claims presented herein.

What is claimed is:

1. Motor driver circuitry for detecting an open-load fault condition, the motor driver circuitry comprising:
   driver transistors coupled to first and second output terminals, each driver transistor having a gate terminal;
   gate driver circuitry having outputs coupled to the gate terminals of the driver transistors;
   controller circuitry coupled to the gate driver circuitry;
   a first current source;
   a first comparator having a first input, a second input, and an output, the first input of the first comparator coupled to the first current source, and the second input of the first comparator coupled to the driver transistors;
   a second current source;
   a second comparator having a first input, a second input, and an output, the first input of the second comparator coupled to the second current source, and the second input of the second comparator coupled to the driver transistors; and
   a multiplexer having a first input, a second input, a control input, and an output, the first input of the multiplexer coupled to the output of the first comparator, the second input of the multiplexer coupled to the output of the second comparator, and the control input of the multiplexer coupled to the controller circuitry.

2. The motor driver circuitry of claim 1,
   further including including fault detect circuitry, the fault detect circuitry comprising:
   a timer; and
   logic circuitry, coupled to the timer and to the output of the multiplexer.

3. The motor driver circuitry of claim 1, wherein the driver transistors are arranged in an H-bridge configuration coupled to the first and second output terminals; and
   wherein the motor driver circuitry further comprises:
      first select having a first input coupled to the first output terminal, a second input coupled to the second output terminal, and a select input coupled to the controller circuitry to receive a first signal, the first select circuitry configured to couple its first input to an output of the first select circuitry responsive to the first signal indicating a positive half-cycle, and to couple its second input to the output of the first select circuitry responsive to the first signal indicating a negative half-cycle.

4. The motor driver circuit of claim 3, wherein the output of the first select circuitry is coupled to the second input of the first comparator and the second input of the second comparator.

5. The motor driver circuit of claim 1, wherein the controller circuitry comprises standstill detection circuitry having an output coupled to the control input of the multiplexer.

6. The motor driver circuit of claim 5, wherein the standstill detection circuitry is configured to provide a signal with a first logical state in response to a motor of the motor driver circuit being in a standstill state, or provide the signal with a second logical state different than the first logical state in response to the motor of the motor driver circuit being in a running state.

7. A method, comprising:
   operating a motor driver circuit to provide a drive current to a motor coil of a motor;
   sensing the drive current;

comparing the drive current to a first current or a second current;
   detecting an open-load condition responsive to a first signal indicating a first operating state of the motor and the comparison indicating that the drive current is less than the first current
   , or detecting the open-load condition responsive to the first signal indicating a second operating state of the motor and the comparison indicating that the drive current is less than the second current; and
   generating an open-load fault signal responsive to detecting the open-load condition.

8. The method of claim 7, wherein the comparison includes:
   at a first comparator, comparing the drive current to the first current; and
   at a second comparator, comparing the drive current to the second current;
   wherein the generating comprises:
      selecting the first comparator or the and second comparator responsive to the first signal; and
      generating the open-load fault signal responsive to the selection.

9. The method of claim 7, wherein the comparison includes:
   applying the drive current at an input of a comparator;
   applying the first current to an input of the comparator responsive to the first signal indicating a first state; and
   applying the second current to an input of the comparator responsive to the first signal indicating a second state.

10. The method of claim 7, wherein the operating the motor driver circuit includes providing the drive current as periodic alternating current at a phase corresponding to a second signal; and
    wherein the generating is performed responsive to the second signal indicating a non-zero phase.

11. The method of claim 7, wherein detecting the open-load condition responsive to the first signal indicating the first operating state includes determining that the drive current is less than the first current for a selected duration; and
    wherein detecting the open-load condition responsive to the first signal indicating the second state includes determining that the drive current is less than the second current for the selected duration.

12. The method of claim 7, wherein the motor driver circuit includes driver transistors arranged in an H-bridge configuration having first and second terminals coupled to the motor coil;
    wherein the operating the motor driver circuit includes providing the drive current as periodic alternating current at a phase corresponding to a second signal; and
    the method further comprises:
       responsive to the second signal indicating a phase in a positive half-cycle, sensing the drive current at the first terminal of the H-bridge; and
       responsive to the second signal indicating a phase in a negative half-cycle, sensing the drive current at the second terminal of the H-bridge.

13. The method of claim 7, wherein the first operating state of the motor includes a standstill state, and wherein the second operating state of the motor includes a running state.

14. A motor driver circuit for detecting an open-load fault condition, the motor driver circuit comprising:
    driver circuitry comprising driver transistors, the driver circuitry coupled to first and second output terminals;

detection circuitry configured to generate a first signal at an output of the detection circuitry, the first signal indicating an operating state of the motor driver circuit;

comparator circuitry having a first input, a second input, a third input, a fourth input, and an output, the third input of the comparator circuitry coupled to the output of the detection circuitry, the fourth input of the comparator circuitry coupled to the driver circuitry, and the comparator circuitry configured to:

compare a drive current at the driver transistors to a first current sensed at the first input of the comparator circuitry responsive to the first signal indicating a first operating state of the motor driver circuit, and compare the drive current to a second current sensed at the second input of the comparator circuitry responsive to the first signal indicating a second operating state of the motor driver circuit;

generate a signal at the output of the comparator circuitry responsive to one of the comparisons; and fault detect circuitry having an input coupled to the output of the comparator circuitry, the fault detect circuitry configured to provide a second signal responsive to the signal at the output of the comparator circuitry.

15. The motor driver circuit of claim 14, wherein the fault detect circuitry includes:

a timer for timing a selected interval; and logic circuitry coupled to the output of the comparator circuitry and the timer.

16. The motor driver circuit of claim 14, wherein the comparator circuitry comprises:

a first comparator having a first input coupled to the first input of the comparator circuitry, a second input coupled to the driver transistors, and an output; and a second comparator having a first input coupled to the second input of the comparator circuitry, a second input coupled to the driver transistors, and an output; and select circuitry having a first input coupled to the output of the first comparator, a second input coupled to the output of the second comparator, and a select input coupled to the output of the detection circuitry.

17. The motor driver circuit of claim 14, further comprising:

a first current source configured to receive a third signal;

a second current source;

wherein the comparator circuitry comprises:

select circuitry having a first input coupled to the first current source, a second input coupled to the second current source, and a select input coupled to the output of the detection circuitry, the select circuitry configured to select the first current source or the second current source responsive to the first signal; and a comparator having a first input coupled to an output of the select circuitry, a second input coupled to the driver circuitry, and an output.

18. The motor driver circuit of claim 17, further comprising:

a controller configured to control the driver circuitry according to a periodic waveform in response to control inputs, and generate the third signal corresponding to a phase of the periodic waveform;

wherein the driver transistors are arranged in an H-bridge configuration coupled to the first and second output terminals; and wherein the comparator circuitry includes:

first select circuitry having a first input coupled to the first output terminal, a second input coupled to the second output terminal, a select input coupled to the controller to receive the third signal, and an output coupled to the fourth input of the comparator circuitry, the first select circuitry configured to couple the first input of the first select circuitry to the output of the first select circuitry responsive to the third signal indicating a positive half-cycle, and couple the second input of the first select circuitry to the output of the first select circuitry responsive to the third signal indicating a negative half-cycle.

19. The motor driver circuit of claim 18, wherein the comparator circuitry comprises:

a first comparator having a first input coupled to the first input of the comparator circuitry, a second input coupled to the fourth input of the comparator circuitry, and an output;

a second comparator having a first input coupled to the second input of the comparator circuitry, a second input coupled to the fourth input of the comparator circuitry, and an output; and second select circuitry having a first input coupled to the output of the first comparator, a second input coupled to the output of the second comparator, a select input coupled to the output of the detection circuitry, and an output.

20. Motor driver circuitry for detecting an open-load fault condition, the motor driver circuitry comprising:

driver transistors coupled to first and second output terminals, each driver transistor having a gate terminal;

gate driver circuitry having outputs coupled to the gate terminals of the driver transistors;

controller circuitry coupled to the gate driver circuitry;

a first current source;

a second current source; and select circuitry having a first input coupled to the first current source, a second input coupled to the second current source, a select input coupled to the controller circuitry, and an output;

a comparator having a first input coupled to the output of the select circuitry, a second input coupled to the driver transistors, and an output.

* * * * *